US011674925B2

(12) United States Patent
Klavetter et al.

(10) Patent No.: US 11,674,925 B2
(45) Date of Patent: Jun. 13, 2023

(54) ELECTROPHORETIC DEVICE AND METHOD TO SEPARATE AND DETECT ANALYTE IONS

(71) Applicant: National Technology & Engineering Solutions of Sandia, LLC, Albuquerque, NM (US)

(72) Inventors: Kyle C. Klavetter, Albuquerque, NM (US); Michael P. Siegal, Albuquerque, NM (US); William G. Yelton, Sandia Park, NM (US); Carlos Perez, Albuquerque, NM (US); Amalie L. Frischknecht, Albuquerque, NM (US); Michael C. Wanke, Albuquerque, NM (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 200 days.

(21) Appl. No.: 17/066,703

(22) Filed: Oct. 9, 2020

(65) Prior Publication Data

US 2021/0109061 A1 Apr. 15, 2021

Related U.S. Application Data

(60) Provisional application No. 62/915,356, filed on Oct. 15, 2019.

(51) Int. Cl.
*G01N 27/447* (2006.01)
(52) U.S. Cl.
CPC ... *G01N 27/4473* (2013.01); *G01N 27/44791* (2013.01)

(58) Field of Classification Search
CPC ............... G01N 27/42; G01N 27/4473; G01N 27/44791; G01N 27/44756; G01N 27/44782; G01N 27/49
See application file for complete search history.

(56) References Cited

U.S. PATENT DOCUMENTS

| 11,378,547 | B1* | 7/2022 | Klavetter | G01N 27/404 |
| 2011/0186449 | A1* | 8/2011 | Clochard | G01N 33/1813 |
| | | | | 205/793 |

FOREIGN PATENT DOCUMENTS

WO  WO-2014194047 A1 * 12/2014 ........... B01D 61/027

OTHER PUBLICATIONS

Mo, R. et al., A Mercury ion electrochemical sensor based on porous anodized alumina membrane nanochannels modified with DNA, Journal of The Electrochemical Society, 165(11),p. H750 (2018) (Year: 2018).*

(Continued)

*Primary Examiner* — J. Christopher Ball
(74) *Attorney, Agent, or Firm* — Kevin W. Bieg

(57) ABSTRACT

This invention is directed to an inexpensive, miniaturized, portable, low-power device and method for electrophoretic separation and electrochemical detection of an analyte, including different isotopes of the same element. The invention replaces a conventional or microfabricated capillary electrophoresis tube with a microchip comprising an array of parallel electrophoretic separation nanotubes or aligned hollow channels fabricated in a porous substrate.

18 Claims, 14 Drawing Sheets

(56) References Cited

OTHER PUBLICATIONS

Lopes FS, Coelho LH, Gutz IG. Automated two-dimensional separation flow system with electrochemical preconcentration, stripping, capillary electrophoresis and contactless conductivity detection for trace metal ion analysis. Electrophoresis. Apr. 2011;32(8):939-46. (Year: 2011).*

W.G. Yelton et al., Nano Electrode Arrays for In-situ Identification and Quantification of Chemicals in Water, SAND 2004-6229, Sandia National Laboratories, pp. 1-72, Dec. 2004 (Year: 2004).*

Huang, X., Zare, R.N., Sloss, S. and Ewing, A.G., 1991. End-column detection for capillary zone electrophoresis. Analytical chemistry, 63(2), pp. 189-192. (Year: 1991).*

Lucy, C.A. and McDonald, T.L., "Separation of Chloride Isotopes by Capillary Electrophoresis Based on the Isotope Effect on Ion Mobility," Analytical Chemistry, 1995, vol. 67, pp. 1074-1078.

Kamencev, M. et al., "Isotopic separation of lithium ions by capillary zone electrophoresis," Electrophoresis, 2015, vol. 36, pp. 3014-3017.

Collins, G.E. and Lu, Q., "Microfabricated capillary electrophoresis sensor for uranium (VI)," Analytica Chimica Acta, 2001, vol. 436, pp. 181-189.

Pennathur, S. and Santiago, J.G., "Electrokinetic Transport in Nanochannels. 1. Theory," Analytical Chemistry, 2005, vol. 77, pp. 6772-6781.

Pennathur, S. and Santiago, J.G., "Electrokinetic Transport in Nanochannels. 2. Experiments," Analytical Chemistry, 2005, vol. 77, 6782-6789.

Lucy, C.A. et al., "1998 W.A.E. McBryde Medal Lecture Searching for the Holy Grail in analytical separations 1", Canadian Journal of Chemistry, 1999, vol. 77, pp. 281-290.

Rice, C.L. and Whitehead, R. "Electrokinetic Flow in a Narrow Cylindrical Capillary," The Journal of Physical Chemistry, 1965, vol. 69, pp. 4017-4024.

* cited by examiner

ELECTROPHORETIC DEVICE AND METHOD TO SEPARATE AND DETECT ANALYTE IONS

CROSS-REFERENCE TO RELATED APPLICATION

This application claims the benefit of U.S. Provisional Application No. 62/915,356, filed Oct. 15, 2019, which is incorporated herein by reference.

STATEMENT OF GOVERNMENT INTEREST

This invention was made with Government support under Contract No. DE-NA0003525 awarded by the United States Department of Energy/National Nuclear Security Administration. The Government has certain rights in the invention.

FIELD OF THE INVENTION

The present invention relates to the separation and detection of ions and, in particular, to an electrophoretic device and method to separate and detect analyte ions.

BACKGROUND OF THE INVENTION

Capillary zone electrophoresis (CZE) is commonly used to detect and measure different ionic species. It has also been used to separate and measure the isotopic ratio of several elements. The separation of ionic species using CZE is due to differences in electrophoretic mobility of each species. Isotope mass does not come into the generalized equations for mobility, hence it is not obvious that CZE can separate equally charged isotopes of the same element. Nevertheless, such separations have been demonstrated for isotopes that have different mobilities. Experiments and molecular dynamics simulations find mass dependences resulting in very small mobility differences (e.g., <0.3% for the isotopes of $Cl^-$). The mechanism for mass dependence may result from friction between the solute ion and electrolyte, including short time (<0.05 ps) binary collisions that depend on mass and long time (>0.05 ps) hydrodynamics that do not depend on mass. Hence the dominant contribution may depend on the strength of the solvation shell between the solvate and electrolyte. See I. C. Bourg et al., *Geochim. Cosmochim. Acta* 74, 2249 (2010).

CZE has demonstrated good separation resolution of the naturally abundant isotopes of chlorine: $^{35}Cl$ and $^{37}Cl$. See C. A. Lucy and T. L. McDonald, *Anal. Chem.* 67(6), 1074 (1995). The internal diameter of the CZE tube of Lucy and McDonald was 75 µm and the length was 47 cm. An electric field strength of 42.5 kV/m was applied to the tube using a 20-kV power supply. Indirect detection with chromate at 254 nm was used through an optical port located 40 cm from the injection point, yielding an effective tube length-to-diameter ratio of 5,333:1. Ultrahigh resolution was obtained by adjusting the electroosmotic flow to be slightly less in magnitude but opposite in direction to that of the electromigration of the chloride ions by means of optimizing the electrolyte concentration, buffer composition, electrolyte pH, and applied voltage.

Since 1995, other anion (negative ion) isotopic separations have been performed using CZE for elements up to the atomic mass of Br. More recently, CZE separation and detection of the cation (positive ion) isotopes of $^6Li$ and $^7Li$ has been performed. See M. Kamencev et al., *Electrophoresis* 36(24), 3014 (2015). Such conventional CZE apparatus typically have ≥50 cm long separation tubes and require the use of 10's of kV power supplies to generate sufficient electric fields. Microscale CZE devices have been demonstrated with separation tubes fabricated directly onto a glass substrate surface. See G. E. Collins and Q. Lu, *Anal. Chim. Acta* 436(2), 181 (2001). The tube length was 88 mm with widths of 36 µm and 160 µm for aspect ratios of 2444 and 550, respectively. An 8-kV power supply generated an approximately 91 kV/m electric field. This device was used to electrophoretically separate and optically detect $UO_2^{2+}$ ions from interferents ($Nd^{3+}$, $Y^{3+}$ and $Tm^{3+}$). Due to the large power supply, this microdevice is neither low power nor portable.

SUMMARY OF THE INVENTION

The electrophoretic device of the present invention comprises an array of aligned hollow channels (e.g., dimensions 1 nm to 100 microns in diameter) in a porous substrate, an injection electrode in proximity to the entrance of the hollow channels, a detection electrode in proximity to the exit of the hollow channels, and a means for applying an electrophoresis electric field between the entrance and the exit of the array of aligned hollow channels. Auxiliary and reference electrodes can be added near the injection and detection electrodes. During the operation of the device, a power supply can be used to apply voltages between the injection and detection electrodes or supplemental electrodes at the entrance and exit of the hollow channels and the auxiliary and reference electrodes and to establish the electrophoresis electric field across the array channels.

The method of operation of the electrophoretic device comprises preconcentrating an analyte on the injection electrode, electrodissolution of the analyte from the injection electrode to provide ionized species in a solvent, injecting one or more pulses of the ionized species into the hollow channels of the array, electrophoretically separating the ionized species as they travel through the hollow channels in a time-of-flight type mechanism controlled by electromigration and/or convection-driven flows, and electrochemically detecting the separated ion species at the detection electrode.

The preconcentrating step can comprise electrochemical plating, electrochemical adsorption, chemical adsorption, or physical deposition of the analyte on the injection electrode. The amount of preconcentrated analyte can typically be as small as 0.001 ng/cm² or less, depending on the injection efficiency and the sensitivity of the detector.

The separation process can be achieved in a variety of conditions. The electric field across the array can establish an electrophoretic velocity on the ionized species to be analyzed relative to the bulk fluid and establish an electroosmotic velocity (in the direction opposite to that of the electrophoretic velocity) on the bulk fluid inside the channels that is a function of the chemistry of the solvent into which the species is dissolved and the chemistry and charge of the walls of the hollow channels. This surface charge can be further modified by capacitive charging of a dielectric layer covering an electrically conductive layer (connected to a power supply) that can coat the interior walls of the channel. Additionally, the electroosmotic velocity can be modified by a pressure-driven flow of the bulk fluid that is a function of a pressure gradient across the array.

As an example of the invention, a nanopore array electrophoretic separation device integrated with electrochemical sensing was used to detect the time-of-flight of copper ions through the channels, and demonstrate temporal separation of different copper isotopes. The array comprised a 100-μm thick anodized aluminum oxide (AAO) wafer with 20-nm diameter pores that provided billions/cm² of parallel electrophoresis separation channels. Thin metal films were deposited onto each side of the nanopore wafer to provide the injection and detection electrodes. The separation, quantified using ToF-SIMS, was correlated with the as yet incompletely separated peaks in a measured electrochemical sensing signal. The separation results agreed with the naturally abundant $^{63}Cu/^{65}Cu$ isotopic ratio of 2.2 with detection limits approaching $10^{13}$ atoms. The device represents a 10,000× reduction in CZE tube length from 1 meter to 100 μm. Modeling results suggest that the shorter ion transport length can provide a temporally separated peak measurement in only a few seconds compared to tens-of-minutes for conventional capillary zone electrophoresis.

BRIEF DESCRIPTION OF THE DRAWINGS

The detailed description will refer to the following drawings, wherein like elements are referred to by like numbers.

DETAILED DESCRIPTION OF THE INVENTION

Figure 1:
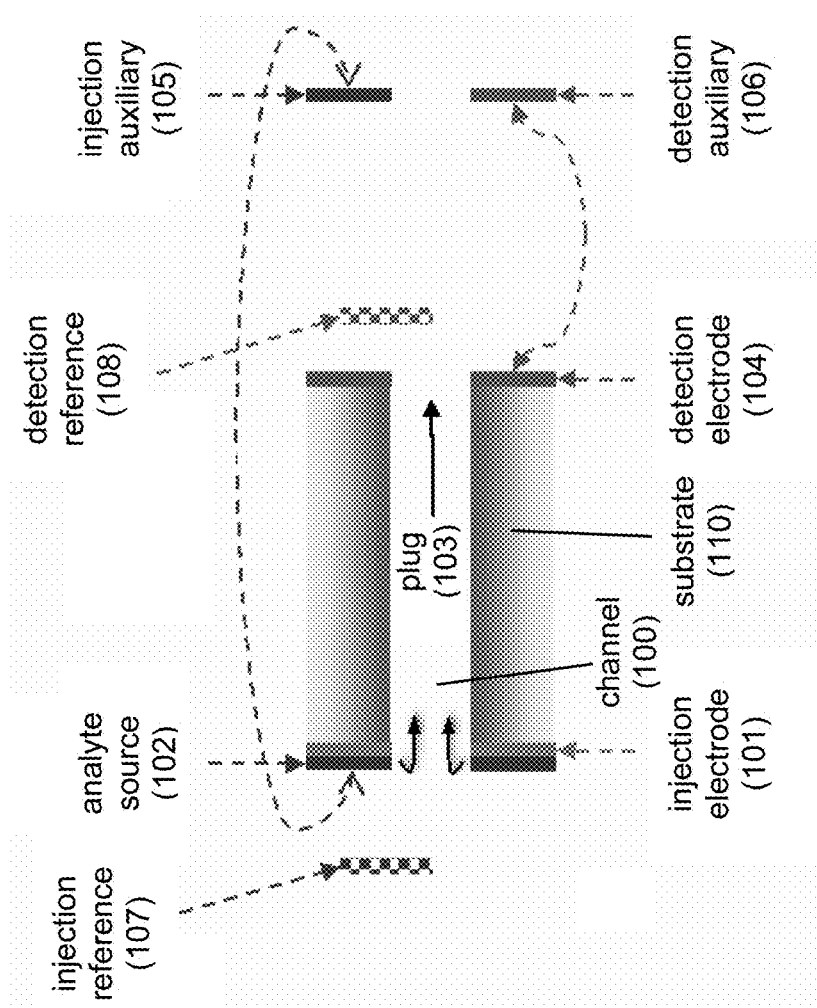
FIG. 1 is a schematic illustration of a single hollow channel for the separation and detection of analyte ions.

The present invention is directed to an inexpensive, miniaturized, portable, low-power electrophoretic device to separate and detect an analyte, including different isotopes of the same element. The invention replaces a conventional or microfabricated capillary electrophoresis tube with a microchip comprising an array of parallel electrophoretic separation nanotubes or hollow channels. These separation channels are hollow pores that have controlled diameters of nano- to microscale and are of the same travel length through the thickness of a porous substrate. The device of the present invention comprises a large plurality of such aligned nanoporous channels in a thin substrate or wafer. The array can have a regular pattern of rows and columns of such hollow channels (e.g., a hexagonal array), but a periodic pattern is not required as long as the hollow channels have the same length and diameter. An exemplary single channel 100 of an array of aligned hollow channels in a porous substrate 110 is shown in FIG. 1. Each channel comprises an "injection" electrode 101 proximate to the channel entrance on which an analyte source 102 can be preconcentrated thereon (e.g., via deposition of the analyte on the injection electrode). As used herein, "proximate" refers to an electrode that is deposited at the entrance or exit of the channel or near enough to the entrance or exit to enable the establishment of an electric field in the channel or enable the injection of analyte into or detection of analyte exiting the channel. The preconcentrated analyte can be electrodissoluted from the injection electrode 101 and the resulting ionized species can be injected into the hollow channel 100 as a plug 103. The ionic species are separated in the channel 100 by electrophoresis. In this example, the electrophoretic field in the channel 100 is established by applying an electric voltage between the injection and detection electrodes 101 and 104. The "detection" electrode 104 proximate to the channel exit can provide for electrochemical detection of the separated ion species as they exit the separation channel. Auxiliary electrodes (i.e., counter electrodes) 105 and 106 and reference electrodes 107 and 108 can be placed near the porous array. The reference electrode(s) can be used to establish the electrical potential against which other potentials can be measured. There can be a shared reference electrode for the injection and detection electrodes or one reference electrode for each. There can be an auxiliary electrode for each of the injection and detection electrodes. The potential of an auxiliary electrode can be adjusted so as to balance the reaction occurring at the respective working electrode (i.e., injection and detection electrodes 101 and 104). The auxiliary electrode provides a pathway for current to flow without passing significant current through the reference electrode. Therefore, the potential of the working electrode can be measured against a known reference electrode without compromising the stability of that reference electrode by passing current over it. The location and number of auxiliary and reference electrodes servicing each working electrode can vary. The locations of the auxiliary and reference electrodes may be exclusively on one side of the porous array or can be divided between both sides of the porous array and can be in near (<1 cm) proximity or far (>1 cm) from the surface of the porous array. Therefore, numerous electrode configurations are possible.

Figure 2A:
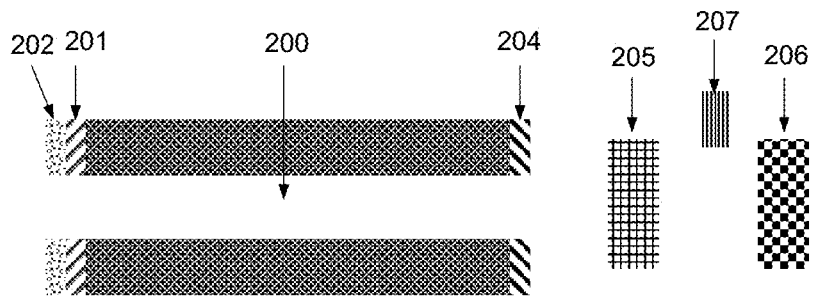
FIGS. 2A-2D are schematic illustrations of a single hollow channel illustrating the pre-injection condition, injection, separation, and detection of an analyte.
Figure 2B:
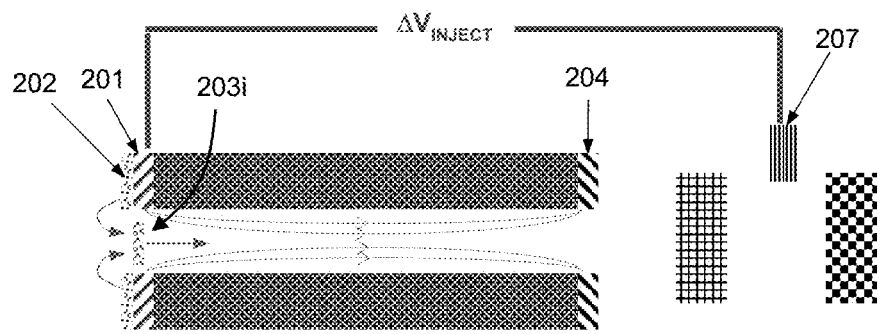
Figure 2C:
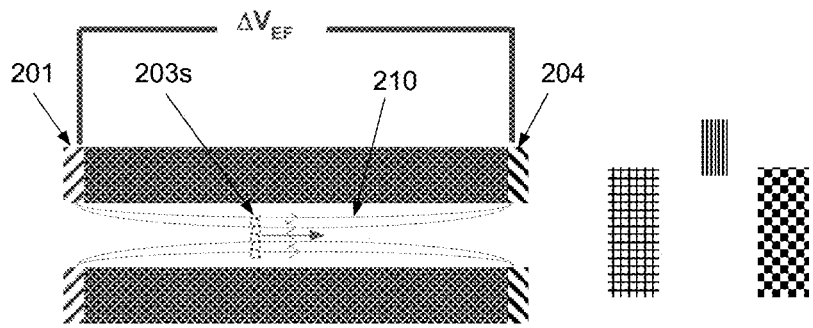
Figure 2D:
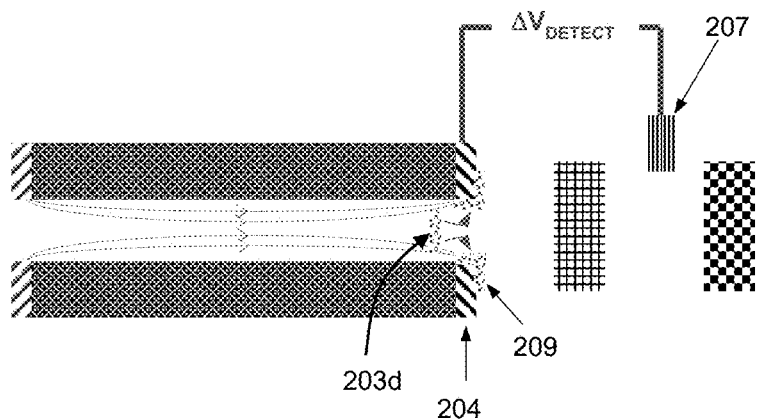

In FIGS. 2A-2D is shown an exemplary configuration wherein injection and detection electrodes 201 and 204 deposited on the porous array serve to inject and detect the analyte 202 as well as to establish an electric field in the hollow channel 200. Auxiliary electrodes 205 and 206 for the injection and detection electrodes 201 and 204, respectively, and one reference electrode 207 (shared by both the injection and detection electrodes) are disposed on the side of the array nearest to the detection electrode 204. FIG. 2A illustrates the initial condition, in which the analyte 202 has been preconcentrated on the injection electrode 201. FIG. 2B illustrates the injection process, wherein the analyte 202 is electrodissoluted from the injection electrode 201 and a plug 203$i$ of the ionized analyte species is injected into the channel 200 upon application of an injection voltage $\Delta V_{INJECT}$ to the injection electrode 201. FIG. 2C illustrates electrophoretic transport of the plug 203$s$ and separation of the ion species in the electric field potential $\Delta V_{EF}$ established between the injection 201 and detection 204 electrodes (direction of the electric field lines 210 is from the electropositive to the electronegative electrode). FIG. 2D illustrates electrochemical detection via electrodeposition 209 of the separated ion species 203$d$ on the detection electrode 204 upon application of a detection voltage $\Delta V_{DETECT}$ to the detection electrode 204.

Control of the electric field and more efficient injection or detection of the analyte ions can be accomplished using one or more supplemental electrodes. Separate supplemental electrodes near the entrance and exit of the channels, other than those used for injection and detection, can provide a more uniform electrophoretic electric field in the hollow channels. Alternatively, the electrophoretic voltage can be applied between a supplemental electrode proximate the entrance or exit of the array and the detection or injection electrode, respectively. Likewise, preconcentration and/or electrochemical detection can occur on injection and/or detection electrodes that are proximate to, but not deposited directly on the entrance or exit of the array.

Figure 3A:
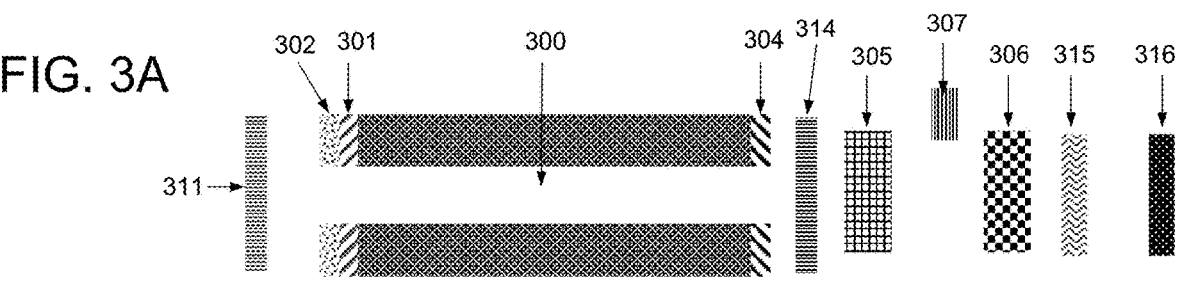
FIGS. 3A-3D are schematic illustrations of a single hollow channel illustrating the pre-injection condition, injection, separation, and detection of an analyte for an alternative configuration of the electrophoretic device. In this configuration, the injection and detection of the analyte is performed by electrodes located at the entrances to the hollow channel while the electric field is controlled by separate supplemental electrodes proximate to the entrance and exit of the hollow channel.
Figure 3B:
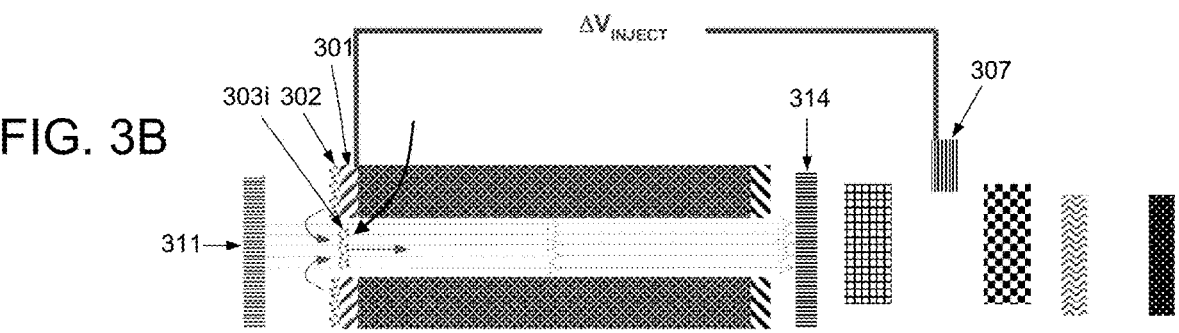
Figure 3C:
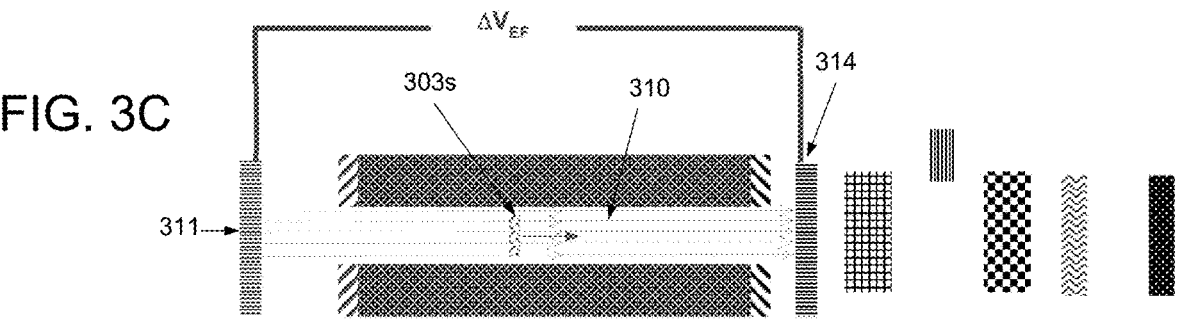
Figure 3D:
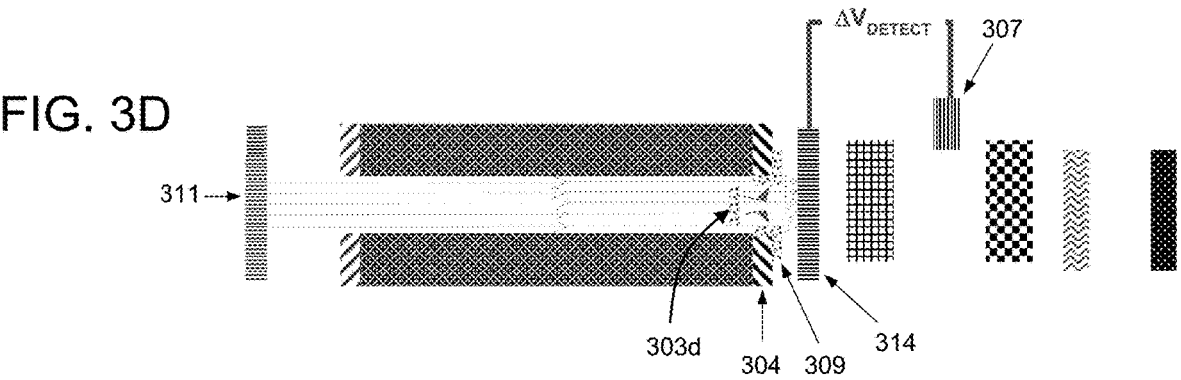

FIGS. 3A-3D illustrate an exemplary configuration in which separate supplemental electrodes 311 and 314 that are located away from, rather than on, the surfaces of the porous array. This can provide a more uniform electric field in the channel. Auxiliary electrodes 305 and 306 for the injection and detection electrodes 301 and 304, auxiliary electrodes 315 and 316 for the supplemental electrodes 311 and 314, and one reference electrode 307 are disposed on the side of the array nearest to the supplemental electrode 314. FIG. 3A illustrates the initial condition, in which the analyte 302 has been preconcentrated on the injection electrode 301. FIG. 3B illustrates the injection process, wherein the analyte 302 is electrodissoluted from the injection electrode 301 and a plug 303$i$ of the ionized analyte species is injected into the channel 300 upon application of an injection voltage $\Delta V_{INJECT}$ to the injection electrode 301. FIG. 3C illustrates electrophoretic transport of the plug 303$s$ and separation of the ion species in the electric field potential $\Delta V_{EF}$ established between the supplemental entrance electrode 311 and supplemental exit electrode 314 (direction of the uniform electric field lines 310 is from the electropositive to the electronegative electrode). FIG. 3D illustrates electrochemical detection via electrodeposition 309 of the separated ion species 303$d$ on the detection electrode 304 upon application of a detection voltage $\Delta V_{DETECT}$ to the detection electrode 304.

Figure 4A:
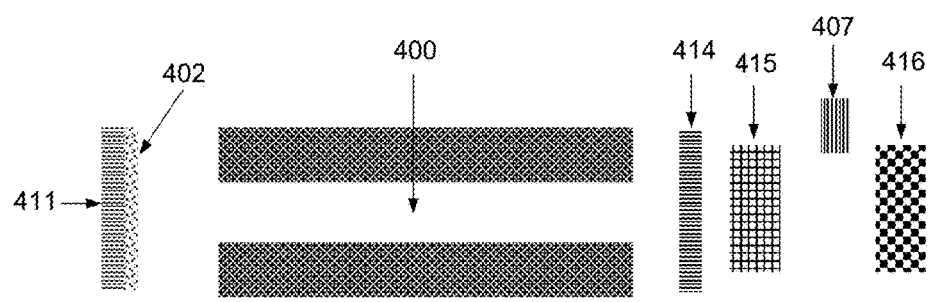
FIGS. 4A-4D are schematic illustration of a single hollow channel illustrating the pre-injection condition, injection, separation and detection of an analyte for an alternative configuration of the electrophoretic device. In this configuration, the injection and detection of analyte as well as the electric field is controlled by injection and detection electrodes proximate to, but not at, the entrance and exit of the hollow channel.
Figure 4B:
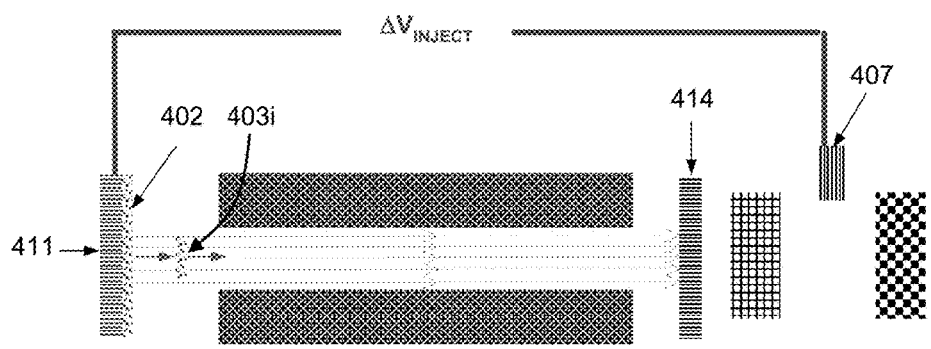
Figure 4C:
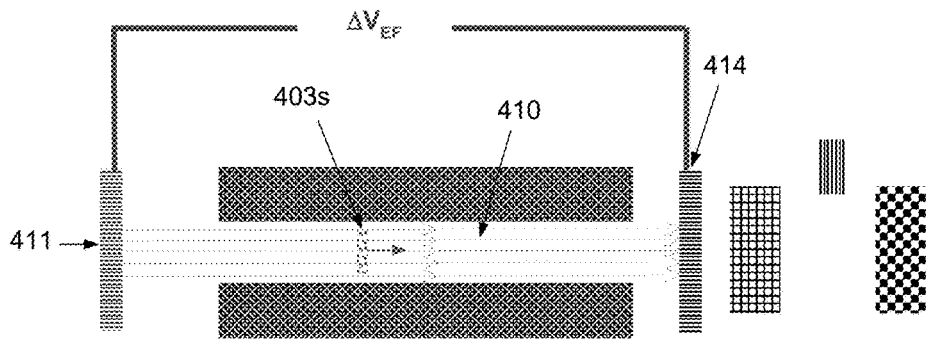
Figure 4D:
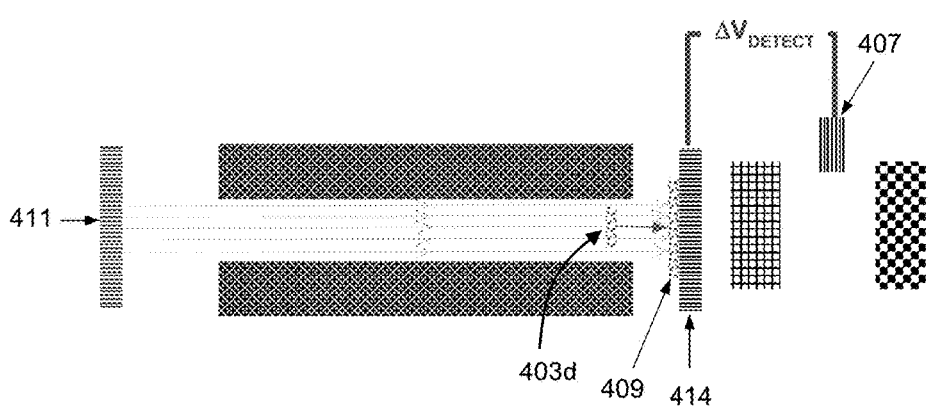

Preconcentration on an injection electrode proximate to, but not on, the entrance to the channel may provide more efficient injection of the ionized analyte into the hollow channels. FIGS. 4A-4D illustrate an exemplary configuration in which the analyte is preconcentrated on an injection electrode 411 proximate to the entrance to the channel and electrodeposition of the separated ion species occurs on a detection electrode 414 proximate to the exit of the channel. Auxiliary electrodes 415 and 416 for the injection and detection electrodes 411 and 414, and one reference electrode 407 are disposed on the side of the array nearest to the detection electrode 414. FIG. 4A illustrates the initial condition, in which the analyte 402 has been preconcentrated on the injection electrode 411. FIG. 4B illustrates the injection process, wherein the analyte 402 is electrodissoluted from the injection electrode 411 and a plug 403$i$ of the ionized analyte species is injected into the channel 400 upon application of an injection voltage $\Delta V_{inject}$ to the injection electrode 411. FIG. 4C illustrates electrophoretic transport of the plug 403$s$ and separation of the ion species in the electric field potential $\Delta V_{EF}$ established between the injection electrode 411 and detection electrode 414 (direction of the uniform electric field lines 410 is from the electropositive to the electronegative electrode). FIG. 4D illustrates electrochemical detection via electrodeposition 409 of the separated ion species 403$d$ on the detection electrode 414 upon application of a detection voltage $\Delta V_{DETECT}$ to the detection electrode 414.

In general, the analyte can comprise chemical species or isotopes of a chemical species that can form ions in a solvent. For example, the analyte can comprise one or more metals, such as alkali, alkaline, refractory, transition, noble and precious metals. The analyte can comprise one or more non-metals, such as semiconducting elements. The analyte can comprise one or more molecules or biological specie (such as viruses or agents). The amount of preconcentrated analyte can be less than 1 mg/cm$^2$ and as small as 0.001 ng/cm$^2$ or less, depending on the areal density of the pores and mass density of the analyte.

The porous substrate can comprise a metal oxide (such as aluminum oxide, silicon oxide, zirconium oxide, titanium oxide), a carbonaceous material, a polymer (such as Vespel), glass, semiconductor, or other porous material. The aligned hollow channels can be formed in the substrate by a variety of methods, including but not limited to electrochemical anodization, lithography, laser etching, electrochemical machining, and chemical etching. For example, the porous substrate can comprise anodized Al-oxide (AAO) or a microchannel plate (MCP). See Anodic aluminum oxide [online]. [retrieved on 9 Sep. 2019], Retrieved from the Internet: <URL: https://en.wikipedia.org/wiki/Anodic_aluminium_oxide, and Microchannel plate detector [online]. [retrieved on 9 Sep. 2019], Retrieved from the Internet: <URL: https://en.wikipedia.org/wiki/Microchannel_plate_detector. The surfaces of the porous array (specifically the interior walls of the hollow channels) can be modified or functionalized by a variety of methods, including atomic layer deposition, electrochemical deposition, and/or chemical reaction (gas or liquid phase). The hollow channels can typically be circular but can be of other cross-sections (e.g., rectangular) with a smallest cross-sectional dimension of 1 nm-100 microns.

As an example of the invention, a device was fabricated using an anodized Al-oxide (AAO) nanoporous substrate. AAO can be fabricated by anodizing Al sheet or foil. Such anodization can fully oxidize the Al metal and create a close-packed array of nanopores through the thickness of the sheet or foil. The pore diameters can be controlled by the anodization conditions and can typically range from less than 5 nm to about 1 µm. For 20 nm pore diameters, this results in an areal density of billions of nanopores/cm$^2$. The AAO thickness can range from less than 1 µm to greater than 200 µm.

To utilize the porous substrates for electrophoretic separation, the top and bottom surfaces can be coated with an electrically conductive material to generate the requisite electric field, as shown in FIGS. 2A-2D. These coatings can also act as "injection" and "detection" electrodes. This deposition can be done with a variety of methods, including but not limited to evaporation, sputtering, and laser ablation. The deposited film can be thick enough to provide electrical conductivity across the entire surface. This thickness will be dependent on the intrinsic surface roughness of the substrate and is a function of the fabrication details. If necessary, a rough surface can be smoothed prior to plating using a variety of methods such as, but not limited to ion beam milling. In addition, the thickness of the coating should not be so great as to block the nanopores. As a rule of thumb, the coating thickness should be less than twice the channel diameter, however, this will vary somewhat for different methods and geometries of deposition, as well as the starting substrate surface roughness. Both the injection and detection electrodes can be nearly any electrically conductive material, such as metals (e.g., silver, platinum, or gold), carbon, diamond, doped diamond, semiconductors, or composites. Requirements for the electrode materials include good adhesion to the substrate surface and electrochemical stability in the analysis environment, which may consist of either acidic or basic solutions depending on the target analytes (anions or cations). A very thin (few nm's) adhesion layer (e.g. titanium, chromium) that adheres well to substrate and electrode material can be used to assist adhesion of the eventual injection or detection electrode materials. Alternatively, supplemental electric field and/or injection and detection electrodes can be disposed in proximity to entrance and exit of the hollow channels, as with the exemplary configurations illustrated in FIGS. 3A-3D and 4A-4D.

Method to Separate and Detect an Analyte

The method to separate and detect analyte ions comprises four steps:
1) Preconcentration of the analyte on an injection electrode of an electrophoretic device comprising an array of aligned hollow channels,
2) Electrodissolution of the analyte from the injection electrode to provide two or more ionized species in solution and simultaneous injection of plugs, or packets, of the ionized species into the hollow channels,
3) Electrophoretic separation of the ionized species in an electrophoresis electric field of the hollow channels, and
4) Electrochemical detection of the separated ionized species at a detection electrode.

These steps are described in detail below.

Preconcentration of the Analyte

Initially, a packet or plug of analyte ions must be delivered simultaneously into a large plurality of hollow channels. One way this can be accomplished is by preconcentration of the analyte in proximity to the channel entrances and uniform electrodissolution of the preconcentrated analyte across the channel entrance surface, as shown in FIGS. 1, 2A, 3A, and 4A. This preconcentration enables simultaneous injection of tight packets, or plugs, of the ionized analyte into the hollow channels. Preconcentration can be achieved by electrochemical plating, electrochemical adsorption, chemical adsorption, or physical deposition (e.g., evaporation, sputtering, laser deposition, screen printing) of the analyte onto the injection electrode. For example, electrorefining can be used to purify a targeted species from a mixture of metals. Essentially, iterative electrodeposition and dissolution processes can be used to selectively preconcentrate the metal analyte on the injection electrode. For example, a sample consisting of a complex mixture of metals can be dissolved in acid. The metal cations can be electroplated onto a conductive surface, which can be the injection electrode surface on one side of nanoporous substrate. Dissolution of the unwanted metals can be done using stripping voltammetry; selectivity is derived from the metal-specific redox potentials. This plating/stripping process can be repeated until only the target metal species remains present, with the final plating occurring on the injection electrode. The total thickness of this layer, including the electrode film, must be small enough to prevent the channel pores from being blocked.

Electrodissolution of the Preconcentrated Analyte and Injection of the Ionized Analyte into the Separation Channels In conventional CZE, the target ion is concentrated in a liquid aliquot. Injection into the separation tube can be performed hydrodynamically (such as aliquot transport by pressure, e.g. syringe) or electrokinetically (driven by electric field gating as used in microfluidic CZE). However, it is not easy to utilize hydrodynamic injection simultaneously into the large plurality of nanoporous channels of the present invention. It is important that the injection of the ions to be detected and measured be accomplished nearly simultaneously across all of the separation channels, to enable a time-of-flight (ToF) measurement. Accurate detection and measurement of the ion species in a ToF measurement requires that all species begin their travel at nearly the same time. Hence, electrodissolution can be used to inject the preconcentrated analyte into the nanopores.

Figures 5A, 5B:
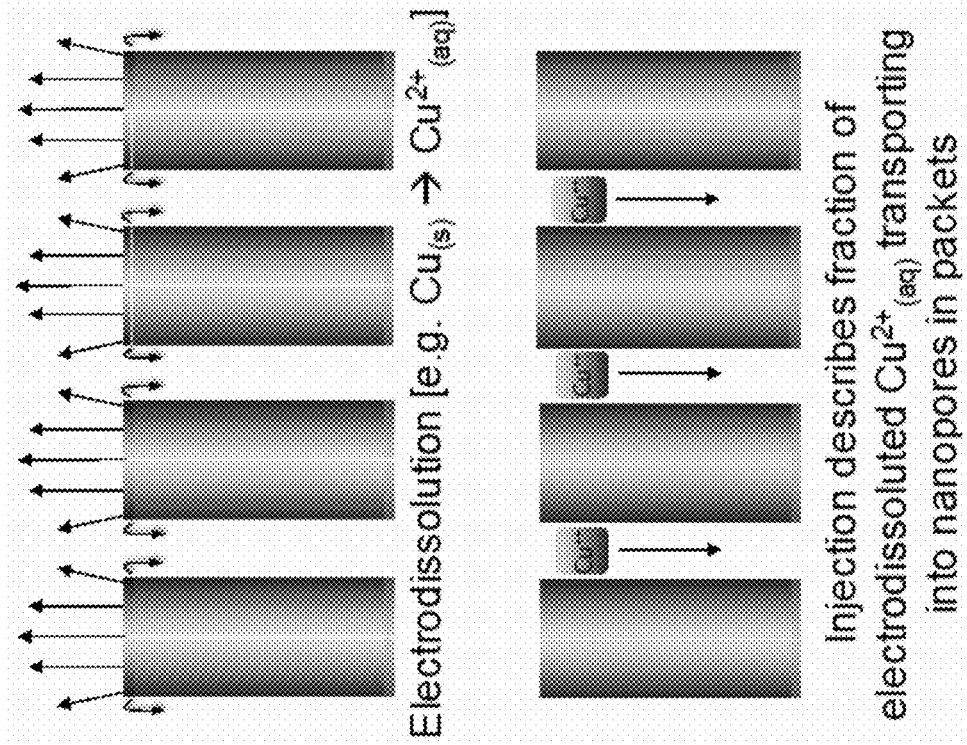
FIG. 5A is schematic illustration of the electrodissolution of copper at the entrance of an array of hollow channels.
FIG. 5B is a schematic illustration of the injection of the electrodissoluted copper ions into the hollow channels.

The preconcentrated analyte material, copper for example, can be released from the injection electrode via electrodissolution via an injection pulse with voltage, $V_{inject}$, as shown in FIG. 5A. Some of the dissoluted species will diffuse into the reservoir above the porous substrate surface. However, the dissoluted ionized species closest to the hollow channels will be pulled into the channels as a packet by the strong electric field established between the electrodes at the entrance and exit of the channels, as shown in FIG. 5B, and also in FIGS. 2B, 3B, and 4B.

In order to inject more of the dissoluted ions and enhance the signal, the reservoir proximate to the injection electrode in the configuration depicted in FIGS. 2A-2D can be filled with an immiscible liquid (e.g., an organic liquid) in which the dissoluted ions are not soluble. For example, this can be achieved by drawing the solvent electrolyte into the channels (e.g., by capillary action) up to the injection electrode and then filling the remaining volume above the porous substrate with the immiscible liquid.

Electrophoretic Separation of the Ionized Species

The goal is to inject a small quantity of ionized species, e.g. $Cu^{2+}$ ions, as a packet or plug into the hollow channels in a very short time after which the injected ions pass through the hollow channels toward the detection electrode. An injection scheme for the exemplary device depicted in FIGS. 2A-2D is graphically represented in FIG. 6. Briefly, the system is allowed to equilibrate between times $t_0$ and $t_1$. A relatively small voltage, $V_{protection}$, can be applied to the injection electrode to prevent the preconcentrated species from oxidation and/or premature dissolution. Injection is performed by applying $V_{inject}$ to the injection electrode, to create a species packet of $Cu^{2+}$ ions between $t_1$ and $t_2$, from electrodissolution of Cu from the deposited analyte film. The ionized packet will contain the naturally abundant ratio of both Cu isotopes. An electric field for electrophoresis $\Delta V_{EF}$ is established by the potential difference set by $V_{inject}$ relative to $V_{detect}$ or, in some circumstances, by adjusting the electric field voltage to a potential higher or lower than $V_{inject}$ after the injection period. The packet will then undergo separation of ionized species, such as isotopes, under the electrophoresis potential difference $\Delta V_{EF}$ between $t_2$ and $t_3$. The separated ion species can be electrochemically measured as a detection current as the cations reach the detection electrode at the nanoporous channel exits at times $t_3$ and $t_4$.

Typically, the material of the channel walls can be selected to have the same charge (positive or negative) as the ions that are being separated. If the pore material is not of the same charge, surface modification of the pore walls can be made by chemical methods, such as functionalizing the wall material, adding surfactant, or adjusting the chemistry of the solvent. Because the Al-oxide isoelectric point is at near neutral to alkaline pHs, its zeta potentials are positive and the pore walls are positively charged in low pH (acid) solutions. As a consequence, AAO is ideal for the electrophoretic separation of cations (e.g., any metal ion). Anion separations can be achieved with a different wall surface material. The walls of AAO can be coated with a variety of oxides using atomic layer deposition, hence AAO substrates can be used as the wafer for any type of ion separation.

Figure 7:
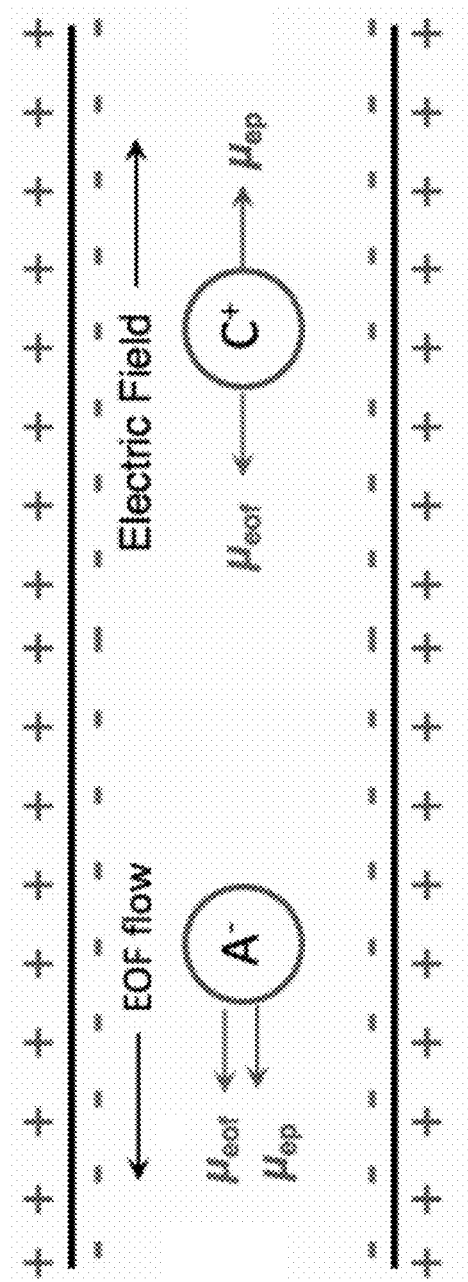
FIG. 7 is a schematic illustration of applied electric field, electroosmotic mobility (eof), and electrophoretic mobility (ep) for either anions ($A^-$) or cations ($C^+$) in a nanoporous channel with positively charged walls. The flow of an ion depends on the vector sum of the two mobilities.

The electric field across the array can establish an electrophoretic velocity on the ionized species to be analyzed and establish an electroosmotic velocity (in the direction opposite to that of the electrophoretic force) on the bulk fluid inside the channels that is a function of the chemistry of the solvent into which the species is dissolved and the chemistry and charge of the walls of the hollow channels. As illustrated in FIG. 7 and as will be described in more detail in the Theory section, the positively charged walls of an AAO substrate attract negative counterions from the electrolyte solution to be adjacent to the walls, forming an electrochemical double layer. The existence of this double layer will cause an electroosmotic flow (EOF) of the electrolyte/buffer ions that is in the opposite direction to the electric field. The strength of the electroosmotic flow can be controlled by several factors, including the type, concentration, and pH of the solvent chemistry. Additionally, the electroosmotic flow can be modified by adjusting the surface charge on the channel walls, for example by capacitive charging of a dielectric layer that can cover an electrically conductive layer (connected to a power supply) that can coat the interior walls of the channels. Additionally, the bulk flow can be modified by imposing a pressure difference across the channels. By adjusting the balance between the electroosmotic (potentially further modified by the pressure difference) and electrophoretic velocities, the time a cation takes to travel the length of the channel can be increased or decreased, enabling optimization of the separation resolution. In general, separation resolution can be achieved by adjusting the electroosmotic flow to be nearly equal in magnitude and opposite to the electrophoretic migration velocity of the cations by optimizing the electrolyte concentration, buffer composition, electrolyte pH, surface charge, pressure differential, and applied voltage.

Figure 8:
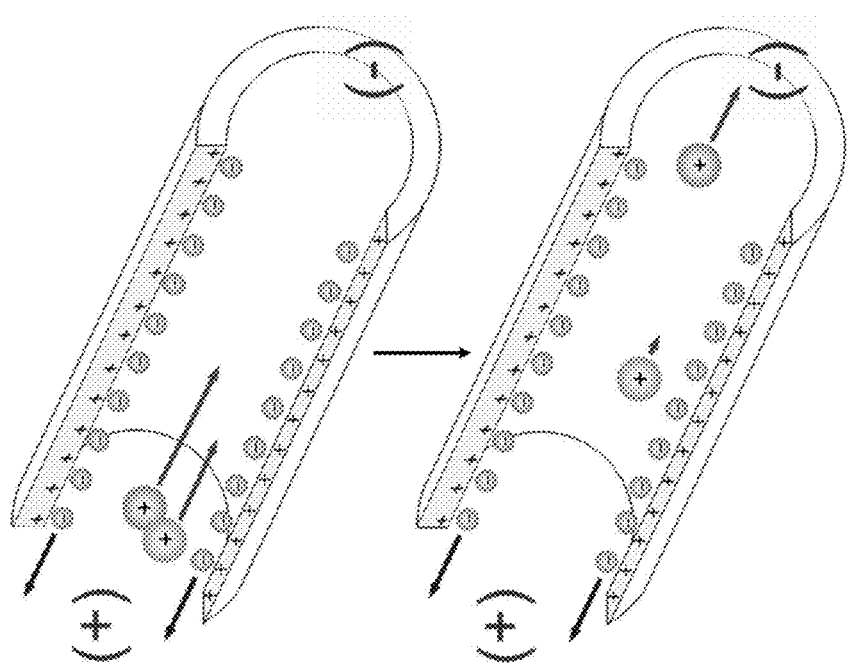
FIG. 8 is a schematic illustration of electrophoretic separation of two different ions in a nanoporous channel.

FIG. 8 illustrates the case within a single channel for the forces acting on different cations. Separation is governed by the intrinsic difference in the electroosmotic mobilities between the cations and appropriately tuning the electroosmotic force relative and electrophoretic force on the cations. In particular, the total observed mobility is a combination of the electroosmotic mobility $\mu_{eof}$ and the electrophoretic mobility $\mu_{ep}$.

Electrochemical Detection of the Separated Ionized Species

Figure 6:
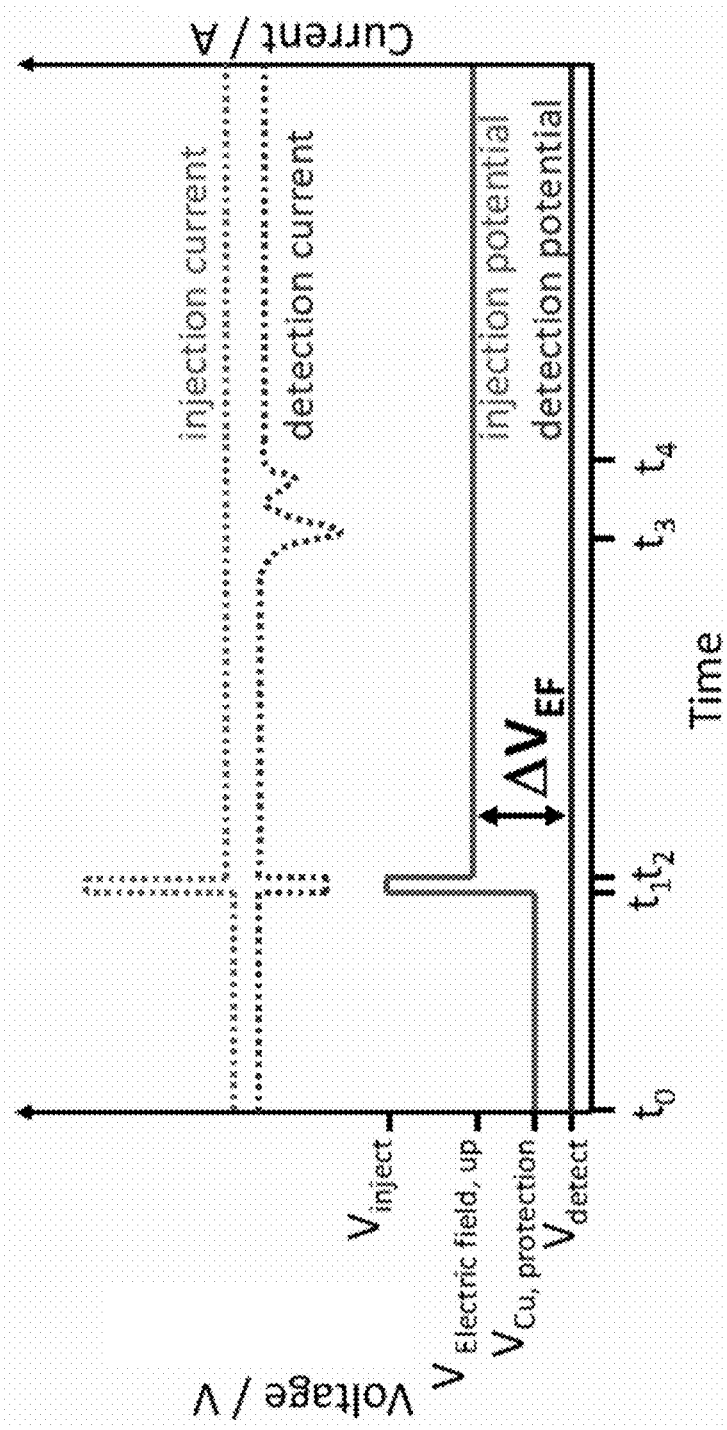
FIG. 6 is a graph showing the potentials applied to inject, separate, and detect $Cu^{2+}$ isotopes on a voltage and current vs time plot for the electrode configuration illustrated in FIGS. 2A-2D. Solid lines indicate injection and detection electrode voltages. Dotted lines indicated injection and detection currents.

Since the invention operates intrinsically under electrochemical conditions, electrochemical detection can conveniently be used to detect and measure the various ionic species after they are separated in the nanoporous channels. Amperometric detection has several advantages for the detection of ions, including simplicity, selectivity, direct and continuous sampling across the entire device, measurement efficiency, and controlled and low background noise. Preferably, chronoamperometry can be used for ion detection. Essentially, a detection voltage is turned on after completing sample injection and a detection current is measured as a function of time due to electrodeposition of the separated ions at the detection electrode, as shown in FIG. 6. If species separations occur, then more than one peak in current will occur as a function of transport time through the hollow channels. In the case of $Cu^{2+}$, there are two naturally abundant mass isotopes: $^{63}Cu$ and $^{65}Cu$. Lighter mass isotopes will travel faster through the channels. Alternatively, or in addition, other detection methods, such as optical methods, can be used to detect the separated ions.

Amperometry uses simple and miniaturizable equipment to apply a stable potential and accurately measure resulting currents. The equipment does not need to be in a particular proximity or orientation to the actual separation device, as required with other detection methods. Further, in the device configurations illustrated in FIGS. 2 and 4, a potential can be applied to the conductive surface that is the "exit" to the separation channels that not only detects ions, but simultaneously controls ion transport within the channels. Alternatively, the electrophoretic field and electrochemical detection electrodes can be separate electrodes, as illustrated in FIG. 3.

Since a unique voltage is required to accomplish the electrochemical phase change between the ionic and metal phase for every species, a voltage can be selected for detection that also provides a degree of selectivity during sampling. For example, the reduction potential equation for $Cu^{2+}$ is higher than the reduction potential equation for $Ni^{2+}$. However, many metal cation species reduce at potentials more electropositive than that for $Cu^{2+}$, such as $Ag^+$. Selectivity for these species can be achieved by selective preconcentration and by calibrating the residence times of known cations before testing for unknowns.

Amperometry is performed across the entire device without prejudice to a particular spatial location, i.e. every channel in the device operates in parallel. Also, the measurement is continuous in time. Sampling can be performed at intervals ≤20 μs, depending on the equipment capabilities. This sampling time is fast relative to the timescale of the analyte velocity (seconds). The ring geometry of the electrode area that surrounds each nanoporous channel on the device surface will result in sampling a large fraction of the ions that travel through the nanochannels.

Finally, the background current is stable (several to tens of nA in amplitude, depending on conditions) and can be adjusted/mitigated by varying the potential selected for detection of the ions.

As an example, the detection mechanism of $Cu^{2+}$ ions in the device is electrochemical reduction. Electrochemical reduction is the process by which the oxidation state of a dissolved ion species in proximity to an electrode is reduced by electron transfer from the electrode. In the case of the aqueous phase and dissolved $Cu^{2+}$ ion, the reduction process is $$Cu(aq)^{2+} + 2e^- \rightarrow Cu(s).$$

The detection of $Cu^{2+}$ is accomplished by measuring current, where one $Cu^{2+}$ is counted for every two measured electrons. This reaction is driven by application of a sufficiently electronegative potential to the detection electrode used to reduce $Cu^{2+}$ ions. Theoretically, the voltage required to drive this reduction reaction is described by:

$$E = 0.337 + 0.0295 + \log C[Cu^{2+}]$$

where E is a threshold potential, i.e., the least electronegative potential required to reduce $Cu^{2+}$ ions of a concentration, $C[Cu^{2+}]$. See M. Pourbaix, *Atlas of Electrochemical Equilibria in Aqueous Solutions*, National Association of Corrosion Engineers, Houston, Tex., 1974. In practice, this threshold potential will be different than the theoretical value, as the actual value of the threshold potential is a function of the specific environment of the electrochemical reaction, including the material used for the electrode, the electrolyte type and concentration and the geometry of the electrochemical cell.

Preferably, the applied potential and pH are selected such that the separated cation will electroplate onto the detection electrode without undergoing oxidation. It is preferable to set the voltage sufficiently electronegative to enable detection, but high enough to avoid the reduction of water, which would add substantial background noise to the detection. The particular reduction reaction responsible for noise in the current is the reduction of protons to generate hydrogen gas. This reaction is a function of the pH of the electrolyte and is described by the equation $E = 0.000 - 0.0591 + pH$. To prevent pH drift due to the hydrolysis of carbon dioxide gas to carbonic acid in the electrolyte, the electrolyte's pH can be adjusted to about pH 5 by hydrochloric acid (which has the same anion as the supporting electrolyte, potassium chloride). To minimize noise due to the generation of hydrogen gas, the detection electrode material preferably can be gold. The generation of hydrogen at gold electrodes is relatively kinetically slow, about two orders of magnitude slower compared to other noble (stable) metals (Ir, Rh, Pt, Pd). See D. Sawyer et al., *Electrochemistry for Chemists*, 2 ed.; 1995.

Figure 9:
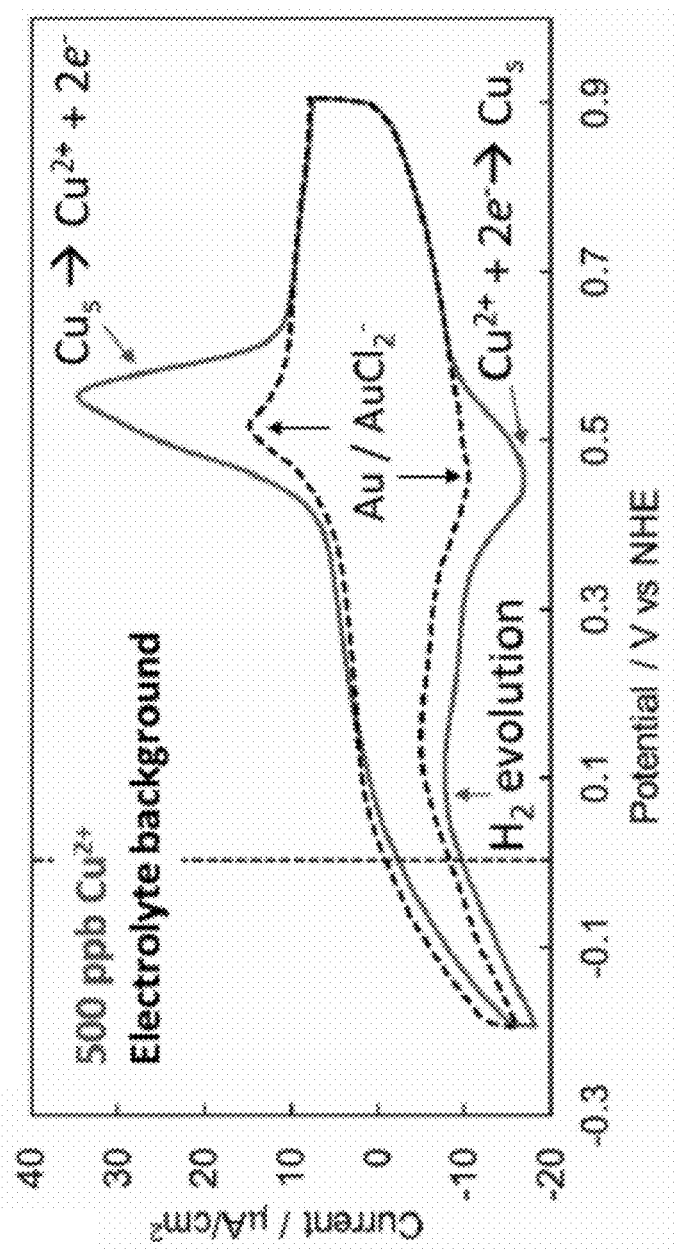
FIG. 9 is a cyclic voltammetry plot to determine a chronoamperometric detection potential. The dashed line represents a scan in $N_2$ purged 10 mM KCl, pH 5 (set by HCl) electrolyte. The solid line represents a scan in electrolyte+500 ppb $Cu^{2+}$ (from $CuCl_2$). The dashed vertical line represents the detection voltage of 0.01 V vs NHE.

Cyclic voltammetry can be used at the selected pH and electrolyte concentrations to more clearly identify a specific detection potential to measure the electrochemical transfer of electrons due only to the reaction of an aqueous analyte to a solid plated film. This voltage can be selected for the chronoamperometry measurement of the electrophoretically separated species. For example, the detection potential can be set to 0.01 V vs NHE to satisfy the requirement that the potential be sufficiently electronegative to enable detection of $Cu^{2+}$ at concentrations as low as 1 ppb. By cyclic voltammetry measurements on a gold electrode in 10 mM KCl, pH 5 (set by HCl) in a $N_2$ purged bath, shown in FIG. 9, the current from electrolyte reduction can be determined to be acceptable at this potential, only about twice the value of the baseline for hydrogen evolution at more electropositive potentials.

Figure 10:
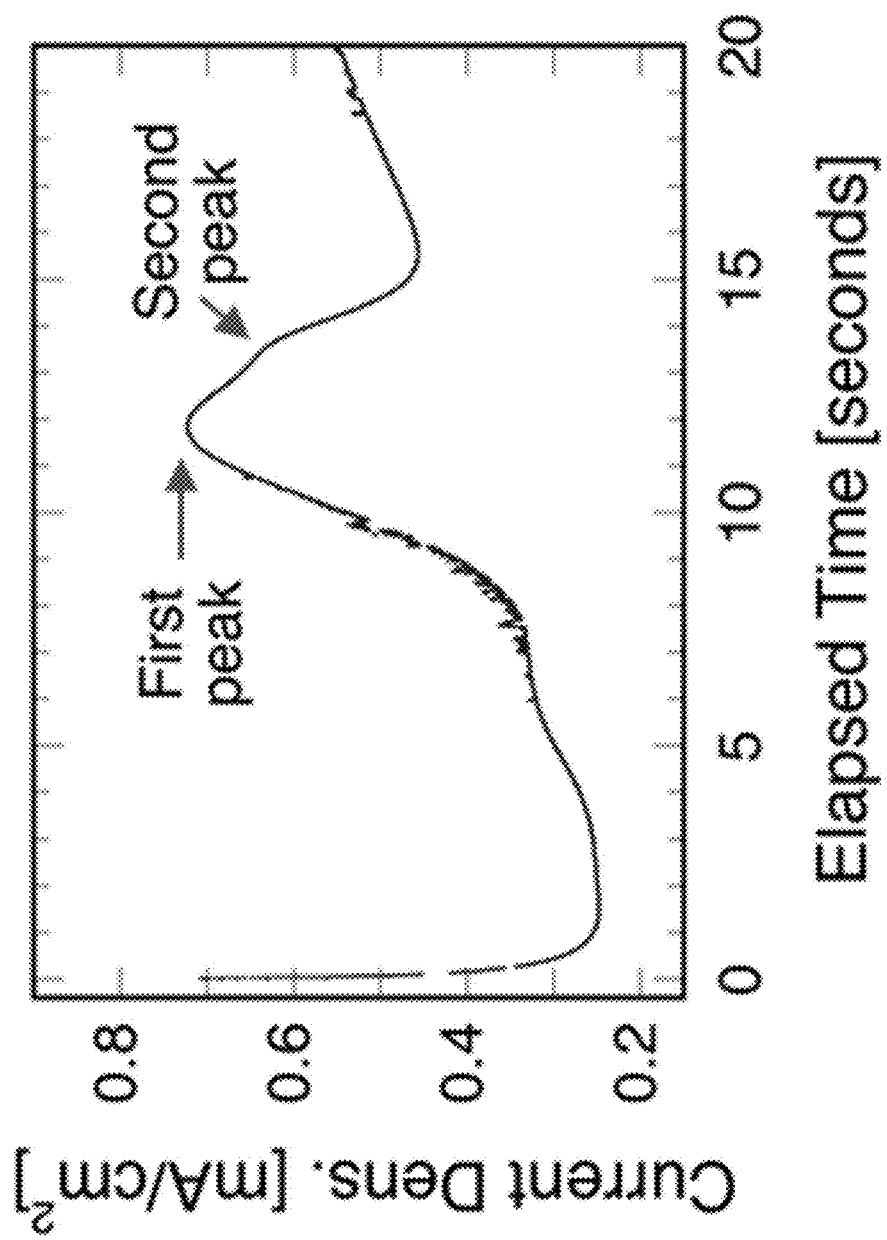
FIG. 10 is a graph of chronoamperometric detection of copper species at the detection electrode.

The detection current can be measured as a function of time after starting the injection pulse. FIG. 10 shows the experimental results of an AAO device for the detection of $Cu^{2+}$ ions passing through the electrophoretic device. The First Peak and the Second Peak may represent the detection of separated ionic species arriving at the detection electrode. The initially decaying and subsequently rising baseline current is a consequence of the proximity of the injection and detection electrodes to one another. Essentially, the current from the injection electrode results in capacitive charge compensation current at the detection electrode, here defined as crosstalk. Because of this crosstalk phenomenon, the detection background current is not stable, but instead reflects the current from the injection electrode. Initially, the injection current is large and rapidly diminishes as a consequence of the oxidation of the copper to copper ions. However, the injection current does not return to zero, but instead supports an anodic current attributable to the oxidation of water and the electrolyte. As a consequence, the detection current does not immediately return to baseline. This crosstalk can be minimized via selection of the electrode material, spacing of the electrodes, controlling the system pH, the electrolyte concentration, and the nanopore diameter size.

Figure 11A:
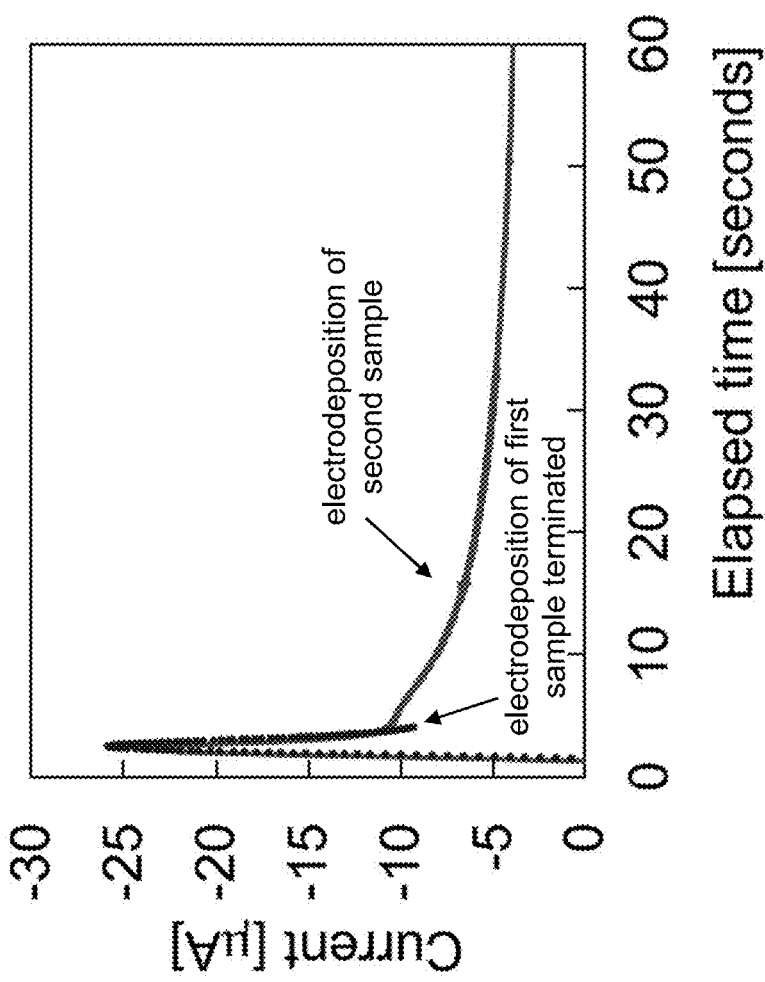
FIG. 11A is a graph of the current for two copper samples that were electrodeposited for different lengths of times.
Figure 11B:
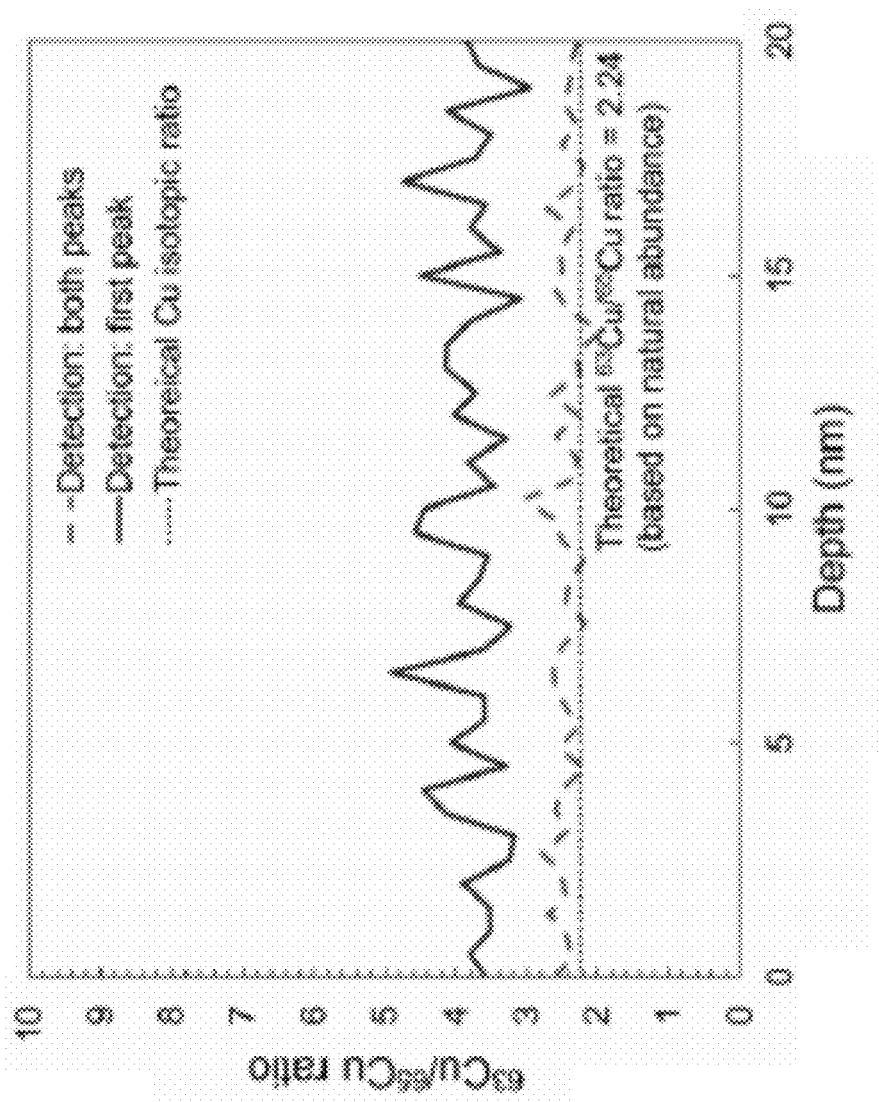
FIG. 11B is a ToF-SIMS plot showing the ratio of the two Cu isotopes ($^{63}Cu/^{65}Cu$) for the two electrodeposited samples.

Time-of-Flight Secondary Ion Mass Spectrometry (ToF-SIMS) analysis of copper samples deposited on the detection electrode was performed to more definitely identify the nature of the two experimental peaks. The ToF-SIMS analysis can detect both $^{63}Cu$ and $^{65}Cu$ isotopes and measure their relative ratio as a function of depth below the surface of the deposit. For the first sample, the detection experiment was terminated shortly after the appearance of the first peak and before the appearance of the second peak. For the second sample, the experiment was ended after the appearance of both peaks. The electrochemical measurements for these two samples are shown in FIG. 11A. The ToF-SIMS results are shown in FIG. 11B. The atomic ratio of the naturally abundant isotopes of Cu is 2.24, essentially the same ratio measured for the second sample. However, the first sample that was prepared by terminating the experiment shortly after the first peak arrival has a significantly higher average isotope ratio of 3.79. This indicates significant separation of the lighter $^{63}Cu$ isotope to an atomic percentage of 79% onto the device detection electrode.

Theory

The theory of Pennathur and Santiago can be used to analyze the separation of ions in nanoporous channels. See S. Pennathur and J. G. Santiago, *Anal. Chem.* 77, 6772 (2005); and S. Pennathur and J. G. Santiago, *Anal. Chem.* 77, 6782 (2005). To achieve good separation, the concept of mobility counterbalancing can be applied, meaning that the electroosmotic flow in the channel can be tuned to be opposite in direction and somewhat less than the electrophoretic flow of the solution. A background electrolyte concentration can be found that meets this condition in nanoporous channels. The channel length and applied electric fields can be determined to achieve good separation.

Capillary zone electrophoresis typically has a background electrolyte in a small capillary with charged surfaces. An applied electric field causes a fluid flow, known as the electroosmotic flow (EOF), due to the presence of the double layer near the capillary walls, as shown in FIG. 7. To perform a separation, a plug of analyte ions is introduced into the capillary. The electrophoretic force on the ions in the analyte plug due to the external electric field E is simply F=qE, where q is the ion charge. This force is balanced by the drag on the ions due to the bulk fluid. At steady state, the result is a constant electrophoretic velocity relative to the fluid that is given by $v_{EP}=\mu_{EP}E$, where $\mu_{EP}$ is the electrophoretic mobility of the ions, and is related to the ion radius r and fluid viscosity $\eta$ (in the simplest form, $\mu_{EP}=q/6\pi\eta r$). The ions are also moving in the fluid EOF, so the total velocity, or the total observed mobility pobs, relative to the stationary tube, is a sum of both the electroosmotic and electrophoretic mobilities:

$$\mu_{obs}=\mu_{EOF}+\mu_{EP} \quad (1)$$

The direction the analyte ion moves depends on its valence, the sign of the wall surface charge, and on the relative magnitude of the electroosmotic and electrophoretic flows. In this example, the anions will move to the left, while cations will move either to the right or to the left depending on whether $\mu_{EOF}$ is smaller or larger than $\mu_{EP}$. A neutral species has mobility $\mu_{EOF}$ and will move to the left, following the EOF flow. When separating two ion species with very small mobility differences, the key is slowing the ion motion in the capillary to allow the mobility differences to be magnified within a finite length. Previous work in the literature used the concept of "mobility counterbalancing" to achieve separation. See C. A. Lucy and T. L. McDonald, *Anal. Chem.* 6, 1074 (1995); C. A. Lucy et al., *NRC Res. Press* 77, 281 (1999); and M. Kamencev et al., *Electrophoresis* 36(24), 3014 (2015). As described by Lucy and McDonald, ultrahigh resolution can be achieved by adjusting the electroosmotic flow to be [nearly] equal but opposite to the electrophoretic migration of the ions. The separation can be optimized with respect to electrolyte concentration, buffer composition, electrolyte pH, and applied voltage.

Thus, the electroosmotic flow velocity in the nanoporous channel device of the present invention can be tuned to nearly balance the electrophoretic flow of the ions of interest, in order to achieve isotopic separation within a short path. This balancing can be modeled for the steady-state flow in a channel to determine the necessary parameters for separation. The standard electrokinetic theory can be applied to modeling ion transport and flow in capillaries. This consists of solving the Poisson-Nernst-Planck (PNP) equations along with the equations for Stokes flow. See R. S. Eisenberg, *J. Membr. Biol.* 150(1), 1 (1996). In this continuum theory, ions are treated as point charges and ion correlations are neglected. The theory consists of coupling together Poisson's equation for the electrostatic field, the Stokes equations to describe the flow of the background fluid, and the Nernst-Planck equations to describe the diffusion and convection of ions in an electrostatic field and fluid flow (i.e., the ion flux). In nanoporous channels, the electrical double layer thickness can be a significant fraction of the channel. This changes the velocity profile of electroosmotic flow and leads to slower electroosmotic velocities compared with flow in micron-sized capillaries. See C. L. Rice and R. Whitehead, *J. Phys. Chem.* 69(11), 4017 (1965). Pennathur and Santiago developed a partially analytic theory for electrokinetic transport in nanoporous channels and showed that the results are very close to full numerical solutions. See S. Pennathur and J. G. Santiago, *Anal. Chem.* 77, 6772 (2005). Their theory can be used to model the flow in the device of the present invention.

As an example, alumina nanoporous channels containing an acidic pH fluid was modeled. The alumina channel walls carry a positive charge, ideal for separating positively-charged metal ion isotopes, such as copper. The electroosmotic flow will oppose the electrophoretic force on the $Cu^{2+}$, shown in FIG. 7. The time each isotope takes to reach the detector at the end of the channel can be calculated, given the injection of a short copper plug. Pennathur and Santiago considered this exact situation, assuming that the analyte (copper) is dilute such that it does not affect the channel wall double layers formed by the background electrolyte, and assuming that the initial plug has essentially a delta function profile. They considered a slit-like (rectangular) channel, but also provided calculations for cylindrical channels. They calculated the area-averaged velocity of the analyte ions along the channel, for a system consisting of a symmetric background electrolyte and analyte ions, and found that the velocity is given by $$\langle u_S \rangle = \frac{\epsilon\epsilon_0 E}{\eta}\left\{\exp\left(\frac{-z_s e(\phi(y)-\phi_c)}{kT}\right)(\zeta-\phi(y))\right\} + z_s eE \quad (2)$$

where $u_s$ is the analyte ion velocity, E is the applied electric field along the channel, $\phi$ is the electrostatic potential due to the double layer across the channel, $\phi_c$ is the potential at the channel center, and $\zeta$ is the zeta potential at the channel wall. Note that the analyte ion velocity is a sum of two terms. The first includes the electroosmotic flow and coupling between transverse electromigration and diffusion, and streamwise advection. The second is simply the electrophoretic term. To employ mobility counterbalancing, these two terms must nearly balance.

The time-dependent concentration of the analyte species is given by $$c_s(x,y,t) = \frac{n_0}{wh}\frac{\exp(-(x-\langle u_s\rangle t)^2/4Dt)}{\sqrt{4\pi Dt}} \times \exp\left(\frac{-z_s e(\phi(y)-\phi_c)}{kT}\right) \quad (3)$$

where D is the self-diffusion constant of the analyte, $n_0$ is the number of moles of analyte introduced in the channel, and w, h are the width and height of the channel. Eq (3) can be used to determine the expected concentration profiles of two analytes, assuming that the initial profile is a thin plug with not too high concentration relative to the background electrolyte (~10× less). This equation is a solution to the streamwise diffusion equation, modified by the transverse concentration profile and including the average flow velocity of the analyte plug from Eq (2). Since the x and t dependence is independent of the second exponential term, Eq (3) can be simplified by including all the y-dependence into a prefactor:

$$c_s(x, y, t) = A(y)\frac{\exp(-(x - \langle u_s \rangle t)^2/4Dt)}{\sqrt{4\pi Dt}} \quad (4)$$

Figure 12A:
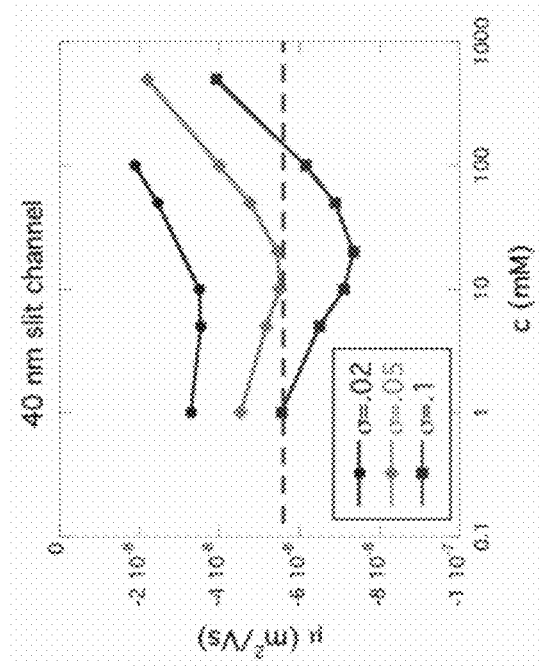
FIGS. 12A-12C are graphs of electroosmotic mobility for $Cu^{2+}$ ions in rectangular channels of varying slit width, as a function of surface charge and background electrolyte concentration.
Figure 12B:
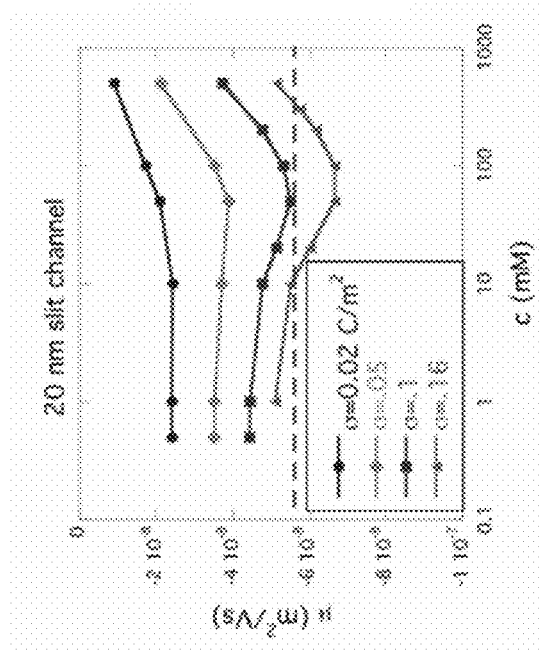
Figure 12C:
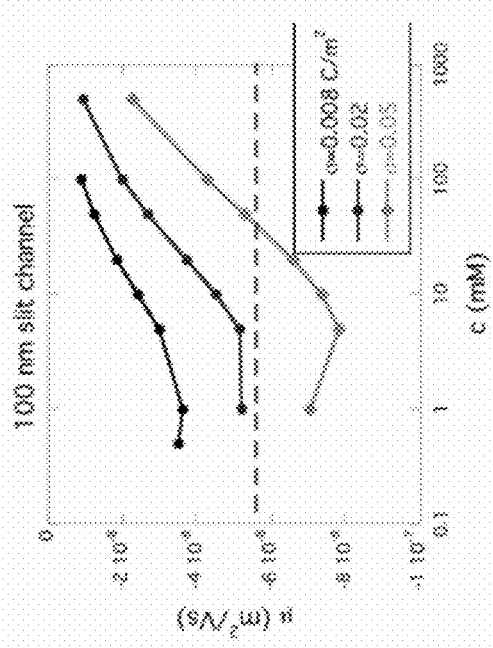

The Poisson-Boltzmann equation can be solved for nanocapillaries to obtain $\phi(y)$ for use in Eq (3) to calculate the expected analyte velocity. As examples, calculations were done for 100 μm long slit-like capillaries of width 10, 20, and 100 nm, which allows the PB equation to be solved in just the transverse direction y. First, the value of $$\mu = \frac{\langle \mu_s \rangle}{E} - v_s z_s F$$

was calculated for $Cu^{2+}$ ions as a function of varying surface charge on the capillary walls; this is the average ion mobility, not including the electrophoretic term (and divided by the electric field strength to obtain a mobility instead of a velocity). The alumina wall surface charge is determined by pH and by the alumina phase present. FIGS. 12A-12C show μ for the three different channel widths, as a function of varying surface charges and background electrolyte concentrations. Ideally, the value of μ should nearly balance the electrophoretic mobility of Cu, which in water is $5.56 \times 10^{-8}$ $m^2/(Vs)$ and is indicated by the dashed lines in the figures. See Springer *Handbook of Experimental Fluid Mechanics*, Edited by C. Tropea, A. L. Yarin, and J. F. Foss. Berlin, Heidelberg: Springer Berlin Heidelberg, 2011, p. 166. These curves are non-monotonic, due to the effect of the electrical double layer extending over a substantial fraction of the nanoporous channel. The confinement leads to a reduction in the magnitude of the electroosmotic mobility. This non-monotonic behavior was observed experimentally by Haywood et al. and shown to match results from nonlinear Poisson-Boltzmann theory. See D. G. Haywood et al., *Anal. Chem.* 86, 11174 (2014).

Depending on the surface charge, it is possible to find a background electrolyte concentration at which p matches the copper mobility. These are the parameter value sets most likely to result in isotopic separation. Note that as the channel gets larger, a smaller surface charge is required to obtain an appropriate μ value. Alumina surface charges depend on both the phase and pH and can range from negative values at high pH (basic conditions) to at least 0.2 $C/m^2$ in highly acidic conditions.

A minimum voltage between ends of the channel needed to achieve isotopic separation can be calculated using the model. The longitudinal concentration profile of a plug of ions starting at z=0 at t=0 when the concentration of the ions is small can be determined starting with Eq. (4). Ignoring the amplitude and the spatial distribution across the channel, the longitudinal profile is $$c_S(x, t) = \frac{\exp(-(x - \langle u_S \rangle t)^2/4Dt)}{\sqrt{4\pi Dt}} \quad (5)$$

where x is the position along the channel axis, $\langle u_s \rangle$ is the average velocity of the analyte ion, t is the propagation time, $D=\mu kT/ze$ is the diffusion coefficient, k is Boltzman's constant, T is the temperature, and e is the charge of the electron. In order to separate two isotopes of an ion, the distance between the centers of the distributions is preferably larger than the width of the peaks after the ions have travelled some distance. The square root in the denominator can be ignored, since it does not change the shape of the pulses. The numerator is just the standard form for a normal distribution. Two peaks are well resolved if the peaks are separated by at least 2 times the half width at the 1/e point of the distribution and assume that the distributions have the same shape. (The latter assumption depends on the rate of spreading compared to the rate of peak separation).

In the rest frame of the background fluid, the separation of the peaks Δx can be expressed as $$\Delta x = u_1 t - u_2 t \quad (6)$$

where $u_i$ is the velocity of the fast (1) and slow (2) isotope. Noting that the velocity is just the mobility times the electric field, and letting $u_1 = (1+\delta)u_2$, this can be expressed as $$\begin{aligned}\Delta x &= u_1 t - u_2 t \quad (7)\\ &= (1+\delta)u_2 t - u_2 t\\ &= \delta u_2 t\\ &= \delta d_{\text{eff}}\end{aligned}$$

where $d_{\text{eff}}$ is the effective distance the ion traveled in the solvent. Note that this distance is not the same as the distance travelled in the channel since the solvent is moving in the opposite direction at the electroosmotic flow velocity.

At a particular point x along the channel (i.e., tube)

$$\begin{aligned}x &= u_{\text{tube}} t \quad (8)\\ &= (\mu - \mu_{EOF})Et\end{aligned}$$

where $u_{\text{tube}}$ is the velocity of one of the isotopes with respect to the tube (channel) wall. Although the velocities of the two ions relative to the solvent are nearly identical, the velocities relative to the channel (and the relative line broadening) can be quite different for the two isotopes if the electroosmotic and electrophoretic mobilities are closely balanced. Keeping the velocities of the two isotopes relative to the channel wall similar to each other for the time being, the previous result implies $$t = \frac{x}{(\mu - \mu_{EOF})E} \quad (9)$$

Plugging this and the fact that $u_2 = \mu_2 E$ into the expression for Δx above yields $$\Delta x = \frac{\delta}{(1 - \mu_{EOF}/\mu)} x \quad (10)$$

Thus, the separation will increase linearly with the length of the channel. It will also increase as the ratio of the mobilities approaches 1.

The width of the peaks when the pulse is at this position can be calculated. Looking at Eq (1), the half width at the 1/e point is just 4Dt. The width can be expressed in terms of x, by using Eq (10) and simplify further using the relation between D and μ to get $$2\sqrt{4Dt} = \sqrt{16\frac{\mu kT}{2e}\frac{x}{(\mu-\mu_{EOF})E}} \quad (11)$$
$$= \sqrt{\frac{8kT}{e}\frac{x}{(1-\mu_{EOF}/\mu)E}}$$

The minimum length using the criteria $\Delta x > 2\sqrt{4Dt}$ is $$\Delta x > 2\sqrt{4Dt} \quad (12)$$
$$\frac{\delta}{(1-\mu_{EOF}/\mu)}x > \sqrt{\frac{8kT}{e}\frac{x}{(1-\mu_{EOF}/\mu)E}}$$
$$\sqrt{x} > \frac{1}{\delta}\sqrt{\frac{8kT}{e}\frac{(1-\mu_{EOF}/\mu)}{E}}$$
$$x > \frac{8kT}{eE\delta^2}\left(1-\frac{\mu_{EOF}}{\mu}\right)$$

By multiplying eq (12) through by the field E, a criterion for the voltage V is obtained:

$$V > \frac{8kT}{e\delta^2}\left(1-\frac{\mu_{EOF}}{\mu}\right) \quad (13)$$

This result is independent of the length of the channel—shorter channels will have faster transit times, but also require much higher fields. Since $\delta$ is a property of the ion to be separated, to decrease the channel length it is necessary to increase E or really match the mobilities well. If the mobility difference between the electrophoretic and electroosmotic terms has to be smaller than the difference between the two ion mobilities in order to satisfy (12), one of the peaks will significantly broaden since the isotope with mobility closer to the electrophoretic mobility will be much slower than the other isotope. Slowing the isotope this much can lead to significant broadening of the peak as diffusion starts to become the dominant transport term. Thus, the distance, field, and mobilities are preferably considered together to find the optimal values given design constraints.

Figure 13:
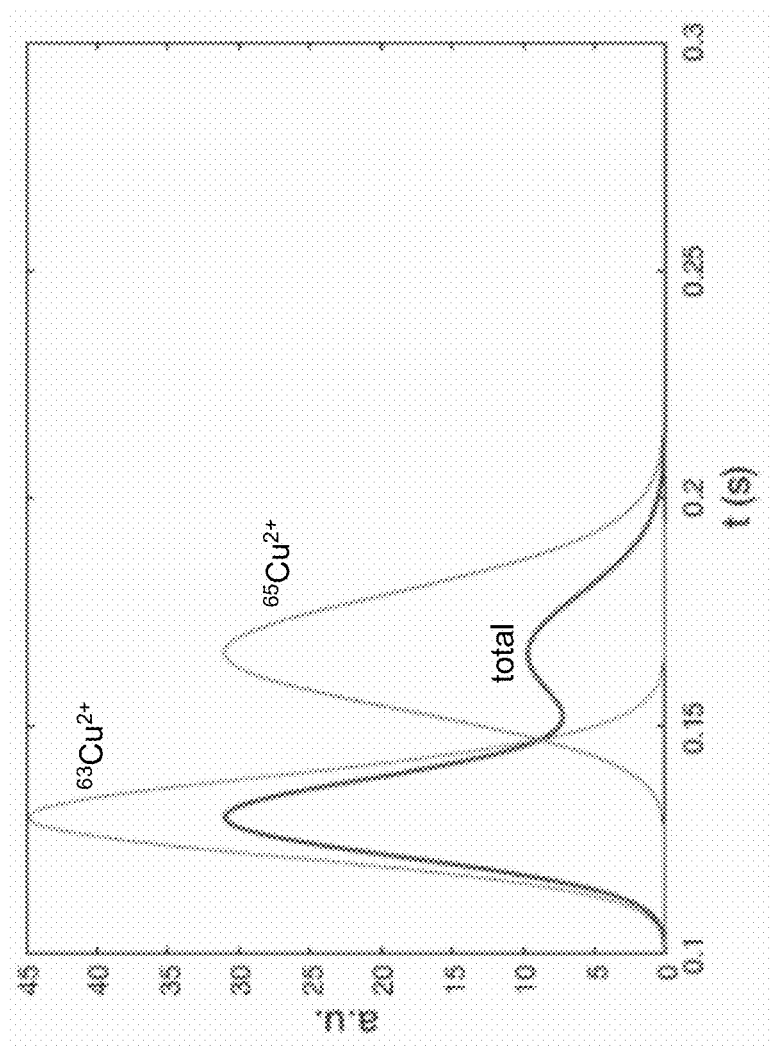
FIG. 13 is a graph of the theoretical concentration of copper isotope ions as a function of time at 200 μm down a channel, for a mobility difference of 0.3%, $\mu=-5.5\times10^{-8}$ $m^2/(Vs)$, and $2\times10^6$ V/m.

To achieve good separation of copper isotopes in the nanoporous channel device requires a large applied voltage. Also, $\mu_{EOF}/\mu$ should not be too close to one, to suppress broadening of the second peak by diffusion. Assuming a channel length of 200 µm, an electroosmotic copper mobility of $5.5\times10^{-8}$ m$^2$/(Vs), and a difference in isotope mobilities of 0.3%, good separation can be obtained at an applied electric field of $2\times10^6$ V/m, or 400 V applied across the capillary, as shown in FIG. 13. According to the analysis above, a minimum voltage of 240V is needed for separation. Note that the actual isotope mobility difference in copper is not known; different values will change these results.

The present invention has been described as an electrophoretic device to separate and detect ionic and isotopic species. It will be understood that the above description is merely illustrative of the applications of the principles of the present invention, the scope of which is to be determined by the claims viewed in light of the specification. Other variants and modifications of the invention will be apparent to those of skill in the art.

We claim:

1. A method for separating and detecting an analyte, comprising:
   providing an electrophoretic device, the device comprising:
      an array of aligned hollow channels in a porous substrate,
      an injection electrode proximate the entrance of the array of aligned hollow channels,
      a detection electrode proximate the exit of the array of aligned hollow channels, and
      a power supply for applying an electrophoresis electric field between the entrance and the exit of the array of aligned hollow channels;
   preconcentrating the analyte on the injection electrode;
   electrodissolution of the preconcentrated analyte to provide at least two ionized species in a solvent;
   injecting a pulse of the at least two ionized species into the array of aligned hollow channels;
   electrophoretically separating the at least two ionized species in the electrophoresis electric field applied to the array of aligned hollow channels; and
   electrochemically detecting the separated at least two ionized species at the detection electrode.

2. The method of claim 1, wherein the analyte comprises isotopes of a chemical species.

3. The method of claim 1, wherein the analyte comprises different chemical or biological species.

4. The method of claim 1, wherein the analyte comprises a metal.

5. The method of claim 1, wherein the at least two ionized species comprise at least two cations.

6. The method of claim 1, wherein the hollow channels are less than 1 centimeter in length.

7. The method of claim 1, wherein the hollow channels are less than 100 microns in cross-sectional dimension.

8. The method of claim 1, wherein the substrate comprises metal oxide, carbonaceous material, polymer, glass, or semiconductor.

9. The method of claim 1, wherein the array of aligned hollow channels comprise anodized aluminum oxide or a microchannel plate.

10. The method of claim 1, wherein the aligned hollow channels further comprise a material deposited on the channel walls.

11. The method of claim 1, wherein an electroosmotic velocity of the solvent is modified by capacitive charging of a dielectric layer on the interior walls of the hollow channels.

12. he method of claim 1, wherein an electroosmotic velocity of the solvent is augmented by a pressure differential across the array that modifies the bulk flow of the solvent in the hollow channels.

13. The method of claim 1, wherein the power supply applies an electrophoresis electric field between the entrance and the exit of the array of aligned hollow channels by applying a voltage between the injection and detection electrodes.

14. The method of claim 1, further comprising at least one supplemental electrode proximate the entrance or exit of the array, wherein the power supply applies an electrophoresis electric field by applying a voltage between the at least one supplemental electrode and the injection or the detection electrode.

15. The method of claim 1, further comprising a supplemental electrode proximate the entrance of the array and a supplemental electrode proximate the exit of the array, wherein the power supply applies an electrophoresis electric field by applying a voltage between the supplemental electrode proximate the entrance of the array and the supplemental electrode proximate the exit of the array.

16. The method of claim 1, wherein the preconcentrating comprises electrochemical plating, electrochemical adsorption, chemical adsorption, or physical deposition of the analyte on the injection electrode.

17. The method of claim 1, wherein the preconcentrating comprises depositing between 0.001 ng/cm$^2$ and 1 mg/cm$^2$ of analyte on the injection electrode.

18. The method of claim 1, wherein the electrochemically detecting step comprises chronoamperometry.

* * * * *